(12) United States Patent
Park et al.

(10) Patent No.: US 9,987,946 B2
(45) Date of Patent: Jun. 5, 2018

(54) APPARATUS FOR CONTROLLING STATE OF CHARGE OF HYBRID VEHICLE AND METHOD USING THE SAME

(71) Applicants: HYUNDAI MOTOR COMPANY, Seoul (KR); KIA MOTORS CORPORATION, Seoul (KR)

(72) Inventors: Jungsoo Park, Seoul (KR); Hong Kee Sim, Seoul (KR); Dong Jun Shin, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 219 days.

(21) Appl. No.: 14/951,409

(22) Filed: Nov. 24, 2015

(65) Prior Publication Data
US 2016/0375789 A1 Dec. 29, 2016

(30) Foreign Application Priority Data
Jun. 29, 2015 (KR) .................. 10-2015-0092453

(51) Int. Cl.
*B60L 11/18* (2006.01)
*B60W 20/10* (2016.01)
(Continued)

(52) U.S. Cl.
CPC .......... *B60L 11/1861* (2013.01); *B60W 20/10* (2013.01); *B60W 20/20* (2013.01);
(Continued)

(58) Field of Classification Search
None
See application file for complete search history.

(56) References Cited

U.S. PATENT DOCUMENTS 8,392,042 B2 * 3/2013 Noiret ................. B60L 7/16
322/16
8,417,428 B2 * 4/2013 Otake ................. B60L 7/10
320/132

(Continued)

FOREIGN PATENT DOCUMENTS

EP 2778004 A2 * 9/2014 ............... B60K 6/48
JP 4894909 B2 3/2012
(Continued)

OTHER PUBLICATIONS

Extended European Search Report EP Application No. 15195845.1 dated Mar. 22, 2017.

*Primary Examiner* — Shelley Chen
(74) *Attorney, Agent, or Firm* — McDermott Will & Emery LLP

(57) ABSTRACT

An apparatus for controlling a SOC of a hybrid vehicle comprises a data detector for detecting data including a SOC of a battery, a vehicle speed, an amount of operating of a brake pedal sensor, an amount of operating of an acceleration pedal sensor, and a driving state of a vehicle to control a SOC of a hybrid vehicle. Included are a correction value calculating unit configured for calculating a correction value of the SOC based on the data; a SOC calculating unit configured for calculating a virtual center SOC based on the correction value of the SOC and an actual SOC; and an engine-on/off determining unit configured for determining whether an engine is turned on or turned off based on the virtual center SOC.

12 Claims, 7 Drawing Sheets

(51) Int. Cl.
 *B60W 20/20* (2016.01)
 *B60W 50/00* (2006.01)
(52) U.S. Cl.
 CPC ............... *B60W 2050/0026* (2013.01); *B60W 2510/244* (2013.01); *B60W 2520/10* (2013.01); *B60W 2540/10* (2013.01); *B60W 2540/12* (2013.01); *B60W 2710/244* (2013.01)

(56) References Cited

U.S. PATENT DOCUMENTS

| | | | |
|---|---|---|---|
| 2002/0107618 A1* | 8/2002 | Deguchi | B60K 6/442 |
| | | | 701/22 |
| 2010/0280694 A1* | 11/2010 | Noiret | B60L 7/16 |
| | | | 701/22 |
| 2010/0286857 A1* | 11/2010 | Otake | B60L 7/10 |
| | | | 701/22 |
| 2013/0024055 A1* | 1/2013 | Hysko, Jr. | B60W 50/0097 |
| | | | 701/22 |
| 2013/0138279 A1* | 5/2013 | Shi | B60L 1/00 |
| | | | 701/22 |
| 2014/0358460 A1* | 12/2014 | Lee | B60L 3/0046 |
| | | | 702/63 |
| 2015/0212161 A1* | 7/2015 | Soga | G01R 31/3606 |
| | | | 702/63 |
| 2017/0282737 A1* | 10/2017 | Miller | B60L 11/1861 |

FOREIGN PATENT DOCUMENTS

| | | |
|---|---|---|
| JP | 2013-035545 A | 2/2013 |
| JP | 2015-009804 A | 1/2015 |
| KR | 10-0949260 B1 | 3/2010 |
| KR | 10-2012-0033834 A | 4/2012 |
| KR | 10-2013-0066983 A | 6/2013 |
| KR | 10-1382953 B1 | 4/2014 |

* cited by examiner

FIG. 5

| | Engine efficiency (low) | | Engine efficiency (high) | |
|---|---|---|---|---|
| Actual SOC (high) | 0 | 0 | 0 | 0 |
| | 0 | 1 | 2 | 3 | 4 |
| | 0 | 2 | 3 | 4 | 5 |
| Actual SOC (low) | 0 | 3 | 4 | 5 | 6 |

APPARATUS FOR CONTROLLING STATE OF CHARGE OF HYBRID VEHICLE AND METHOD USING THE SAME

CROSS-REFERENCE TO RELATED APPLICATION

This application claims the benefit priority to Korean Patent Application No. 10-2015-0092453 filed in the Korean Intellectual Property Office on Jun. 29, 2015, the entire contents of which are incorporated herein by reference.

BACKGROUND (a) Field

The present invention relates to an apparatus for controlling a state of charge of a hybrid vehicle and a method using the same, and more particularly, to controlling a state of charge (SOC) of a hybrid vehicle by determining a virtual center SOC to control a SOC of a battery.

(b) Description of the Related Art

Hybrid electric vehicles may have various structures in which two or more kinds of power sources including an engine and a motor are used. A transmission mounted electric device (TMED) type of power train in which the motor, a transmission, and a drive shaft are connected in series is applied to hybrid electric vehicles.

In addition, an engine clutch is provided between an engine and a motor, and hybrid electric vehicles may be driven in an electric vehicle (EV) mode or a hybrid electric vehicle (HEV) mode depending on whether the engine clutch is engaged or not.

The EV mode refers to a mode in which the vehicle is driven only by driving torque of the motor, while the HEV mode refers to a mode in which the vehicle is driven by driving torque of the motor and the engine. Accordingly, when the hybrid electric vehicle is driven, the engine may be turned on or turned off.

When a high voltage battery is applied to the TMED type of power train, the engine may be turned off in the EV mode. Basically, the engine is controlled to be turned on or off in accordance with an optimal operating point of the engine. For example, in order to control the engine to be turned on or off, the hybrid vehicle has different SOC references by dividing a driving state according to an expressway, a national highway, and a downtown area.

That is, the hybrid vehicle is operated primarily in the HEV mode to charge a battery by controlling the engine to be turned on when driven on the expressway or the national highway, thus having high charging efficiency. In addition, the hybrid vehicle is operated primarily in the EV mode to discharge the battery by controlling the engine to be turned off when driven in the downtown area, thus having low charging efficiency.

Depending on the driving state of the hybrid vehicle, engine operation controls the SOC to be changed. However, as the engine operation may vary, it is difficult to instantly reflect the driving state of the hybrid vehicle. Accordingly, many difficulties are encountered in maintaining the SOC at a predetermined level.

This is because the SOC is not flexibly changed in accordance with a downtown section having low charging efficiency, a medium and high speed section having high charging efficiency, and an ultra-high speed section having low charging efficiency, but it is simply set to normal, charge, and discharge sections.

Accordingly, fuel efficiency of the engine may deteriorate due to entering an idle charge state, entering a full load state, and frequent departures from a normal SOC section.

The above information disclosed in this Background section is only to enhance the understanding of the background of the invention and therefore it may contain information that does not form the prior art that is already known in this country to a person of ordinary skill in the art.

SUMMARY

An objective of the present invention is to provide an apparatus for controlling a state of charge (SOC) of a hybrid vehicle that can, based on controlling to turn on or turn off an engine, determine a virtual center SOC according to charging efficiency, and for controlling a SOC of a battery while varying the virtual center SOC, and a method using the same.

Another objective of the present invention is to provide an apparatus for controlling a SOC of a hybrid vehicle that can decrease a virtual center SOC in a section having high charging efficiency, and increase the virtual center SOC in a section having high charging efficiency, and a method using the same.

Yet another objective of the present invention is to provide an apparatus for controlling a SOC of a hybrid vehicle that can, without considering a virtual center SOC in an extremely congested section, control a virtual center SOC to be fixed to a low level when entering an idle charge section and to be varied stepwise when leaving an extremely congested section.

An apparatus for controlling a SOC of a hybrid vehicle according to an exemplary embodiment of the present invention includes: a data detector configured for detecting data including a SOC of a battery, a vehicle speed, an amount of operating of a brake pedal sensor, an amount of operating of an acceleration pedal sensor, and a driving state of a vehicle to control a SOC of a hybrid vehicle; a correction value calculating unit configured for calculating a correction value of the SOC based on the data; a SOC calculating unit configured for calculating a virtual center SOC based on the correction value of the SOC and an actual SOC; and an engine-on/off determining unit configured for determining whether an engine is turned on or turned off based on the virtual center SOC.

The correction value calculating unit may apply data relating to engine efficiency and the current SOC to an engine efficiency map to calculate a first correction value of the SOC associated with the engine efficiency, apply data relating to motor efficiency and the current SOC to a motor efficiency map to calculate a second correction value of the SOC associated with the motor efficiency, and calculate a third correction value of the SOC associated with the driving state of the vehicle.

The SOC calculating unit may calculate an overall correction value of the SOC by summing the first, second, and third correction values of the SOC.

The SOC calculating unit may calculate a virtual center SOC by applying the overall correction value of the SOC to the current SOC.

The engine-on/off determining unit determines whether the engine is turned on or turned off by applying the virtual center SOC and the vehicle speed to an engine-off map and an engine-on map to calculate engine-off power and engine-on power, and by comparing the engine-on and engine-off powers with power required by a driver.

The correction value calculating unit may further include a driving state determining unit that determines whether the driving state enters an idle charge state and a full load state based on the data.

A method for controlling a SOC of a hybrid vehicle according to an exemplary embodiment of the present invention includes: a first step of detecting data including a vehicle speed, an amount of operating of a brake pedal sensor, an amount of operating of an acceleration pedal sensor, and a driving state of a vehicle by a data detector to control a SOC of a hybrid vehicle; a second step of calculating an actual SOC by a data detector in accordance with the driving state detected from the data; a third step of calculating a correction value of the SOC based on the data by a correction value calculating unit; a fourth step of calculating a virtual center SOC based on the correction value of the SOC and an actual SOC calculated according to each driving mode by a SOC calculating unit; and a fifth step of determining whether an engine is turned on or turned off based on the virtual center SOC and the vehicle speed by an engine-on/off determining unit.

In the third step, engine efficiency and the current SOC may be applied to an engine efficiency map to calculate a first correction value of the SOC associated with the engine efficiency, motor efficiency and the current SOC may be applied to a motor efficiency map to calculate a second correction value of the SOC associated with the motor efficiency, and a third correction value associated with the driving state of the vehicle may be calculated.

In the fourth step, the first, second, and third correction values of the SOC may be summed to calculate an overall correction value of the SOC.

In the fourth step, the overall correction value may be applied to calculate a virtual center SOC.

In the fifth step, whether the engine is turned on or turned off may be determined by applying the virtual center SOC and the vehicle speed to an engine-off map and an engine-on map to calculate engine-off power and engine-on power, and by comparing the engine-on and engine-off powers with power required by a driver.

The engine may be turned off if the power required by the driver is lower than the engine-off power, and the engine may be turned on if the power required by the driver is higher than the engine-off power.

As described above, in the current exemplary embodiment of the present invention, the virtual center SOC may be determined, and the virtual center SOC may be varied to control the SOC of the battery.

In the current exemplary embodiment of the present invention, the virtual center SOC can be decreased in the section having low charging efficiency, while the virtual center SOC can be increased in the section having high charging efficiency.

In the exemplary embodiment, since the virtual center SOC is not considered in the extremely congested section and is fixed to the low level in the idle charge section, the SOC of the battery can be prevented from being excessively increased in the extremely congested section. That is, fuel efficiency can be improved in the extremely congested section.

BRIEF DESCRIPTION OF THE DRAWINGS

FIG. 5 is a table illustrating a map of engine efficiency.

DETAILED DESCRIPTION OF THE EMBODIMENTS

Figure 1:
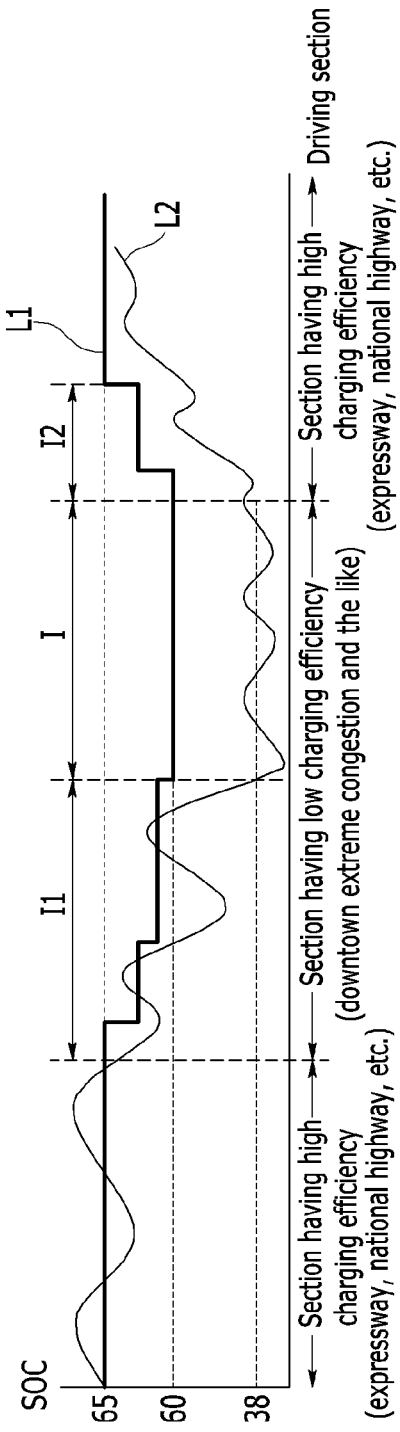
FIG. 1 is a conceptual diagram illustrating a method for controlling a state of charge (SOC) of a hybrid vehicle according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are irrelevant to the description will be omitted to clearly describe an exemplary embodiment of the present invention, and the same or similar components will be designated by the same reference numerals throughout the specification.

FIG. 1 is a schematic view of a method for controlling a state of charge (SOC) of a hybrid vehicle according to an exemplary embodiment of the present invention. First, the method for controlling a SOC of a hybrid vehicle according to an exemplary embodiment will be schematically described with reference to FIG. 1. In the method, the SOC L2 of the hybrid vehicle is controlled by varying a virtual center SOC L1 stepwise in accordance with charging efficiency.

In the specification of the present invention, a virtual center SOC means a target SOC that is determined according to a driving mode of the vehicle (e.g., whether the vehicle is driven in a downtown area, on a national highway, or on an expressway).

That is, the virtual center SOC L1 is calculated in accordance with the charging efficiency. The SOC L2 is controlled by controlling the SOC in accordance with the calculated virtual center SOC L1. That is, in the control method of the current exemplary embodiment, the SOC L2 is controlled to be set to the virtual center SOC L1, since the virtual center SOC L1 is calculated stepwise according to the charging efficiency so as to control an engine to be turned on or turned off.

As shown in FIG. 1, in the control method of the current exemplary embodiment, the virtual center SOC L1 is increased in a section having high charging efficiency (expressway, national highway, etc.), while the virtual center SOC L1 is decreased in a section having low charging efficiency (downtown, extremely congested section, etc.).

In the control method of the current exemplary embodiment, the virtual center SOC L1 is fixed to a low state in an idle charge section I. Since the charging efficiency is low in the idle charge section I of the extremely congested section in a downtown area, the virtual center SOC L1 associated with the charging efficiency is not calculated but is set to the low state (e.g., such that the virtual center SOC is 60%), thereby preventing excessive charging and deterioration of fuel efficiency. In the idle charge section I, the controlled SOC L2 is fluctuated and maintained at a low level.

In the control method of the current exemplary embodiment, the virtual center SOC L1 is decreased stepwise (I1) when entering the idle charge section from the section having high charging efficiency (at the beginning of the extremely congested section in the downtown area), and the virtual center SOC L1 is increased stepwise (I2) when leaving the idle charge section (the extremely congested section in the downtown area).

The actual SOC L2 is fluctuated and decreased in the section where the virtual center SOC L1 is decreased stepwise, while the controlled SOC L2 is fluctuated and increased in the section where the virtual center SOC L1 is increased stepwise.

That is, the virtual center SOC L1 can be controlled to be decreased stepwise such that the charging efficiency is minimally decreased in the section I1 where the virtual center SOC is decreased stepwise and is not the lowest in the idle charge section I, so that the idle charge section I can be maintained for a long time.

Figure 2:
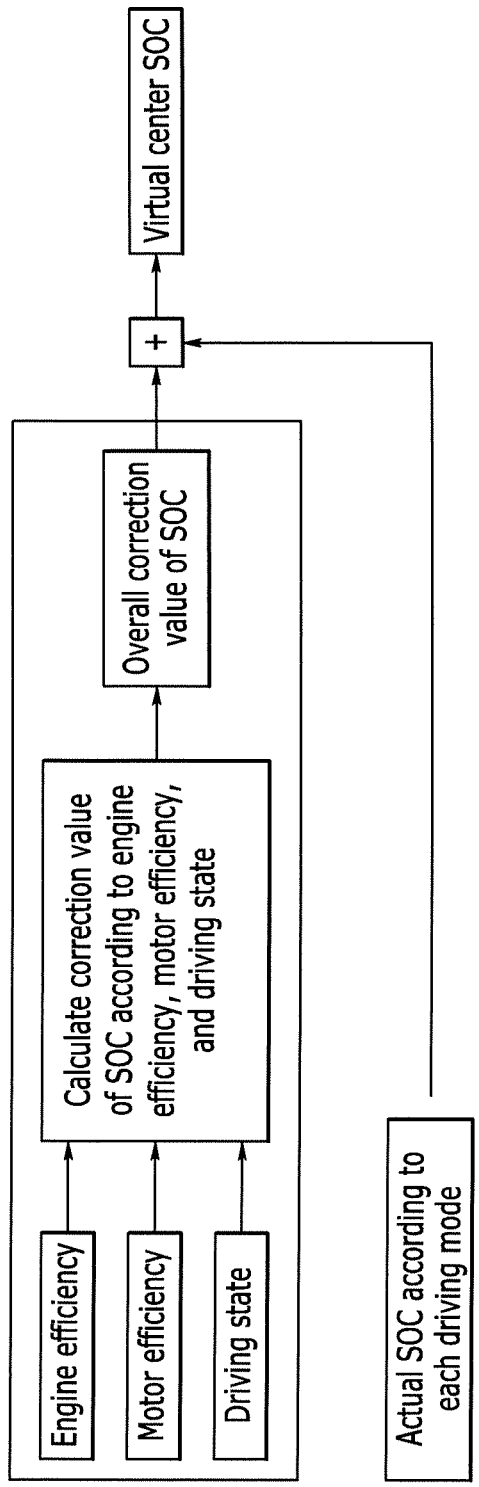
FIG. 2 is a block diagram illustrating a method for considering charging efficiency to be applied to FIG. 1.

FIG. 2 is a block diagram illustrating a method for considering charging efficiency to be applied to FIG. 1. As shown in FIG. 1, a correction value of the SOC is calculated before calculating the virtual center SOC L1.

Referring to FIG. 2, the correction value of the SOC is determined by engine efficiency, motor efficiency, and a driving state of the vehicle. The correction value of the SOC is determined by considering the engine efficiency, the motor efficiency, and the driving state. That is, the SOC value is corrected in accordance with the charging efficiency of the engine, the motor efficiency, and the driving state of the hybrid vehicle. The virtual center SOC may be calculated by reflecting the corrected SOC value to the current center SOC (actual SOC) according to each driving mode that is preset.

Figure 3:
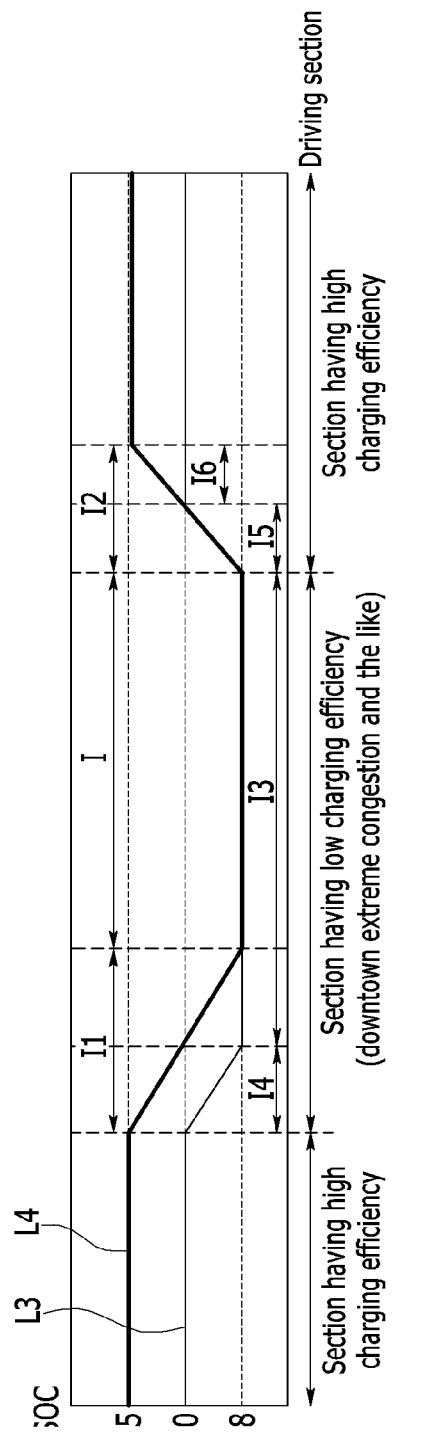
FIG. 3 is a graph schematically illustrating a comparison of a SOC according to an exemplary embodiment of the present invention with a SOC according to the related art.

FIG. 3 is a graph schematically illustrating a comparison of a SOC according to an exemplary embodiment of the present invention with a SOC according to the related art. That is, in FIG. 3, an actual SOC trajectory L3 of the related art and a target SOC trajectory L4, which is calculated by applying the virtual center SOC of the current exemplary embodiment, are compared.

When the target SOC trajectory (refer to L4) of the current exemplary embodiment is compared with the actual SOC trajectory L3 of the related art, the idle charge section I or the full load section can be minimally entered, since the higher actual SOC is secured in the sections having high charging efficiency (before I1 and after I2) and is then used in the section having low charging efficiency.

That is, in the section having low charging efficiency before entering the idle charge section, the actual SOC trajectory L3 of the related art forms a short section I4 in which the SOC is decreased, while the target SOC trajectory L4 of the current exemplary embodiment of the present invention forms a long section I1 in which the SOC is decreased stepwise.

In addition, after the idle charge section, in the section having high charging efficiency, the actual SOC trajectory L3 of the related art forms a short section I5 in which the SOC is increased, while the target SOC trajectory L4 of the current exemplary embodiment of the present invention forms a long section I2 in which the SOC is increased stepwise. The current exemplary embodiment has optimal charging efficiency in a subsection I6 of the section I2 where the SOC is increased. The target SOC trajectory L4 of the current exemplary embodiment may realize higher charging efficiency in the subsection I6 than the actual SOC trajectory L3 of the related art.

Compared with the actual SOC trajectory of the related art, the target SOC trajectory L4 of the current exemplary embodiment may sufficiently secure the SOC in the sections having high charging efficiency (before I1, I6, and after I6), and fully use the secured SOC in the section I having low charging efficiency and in the previous and next sections (e.g., I1, I5).

In addition, the target SOC trajectory L4 of the current exemplary embodiment has the shorter idle charge section I than the actual SOC trajectory L3 of the related art. That is, in the current exemplary embodiment, overdischarge can be prevented in the idle charge section I to improve fuel efficiency.

An apparatus for controlling the SOC as described above and a method using the same will now be described in detail.

Figure 4:
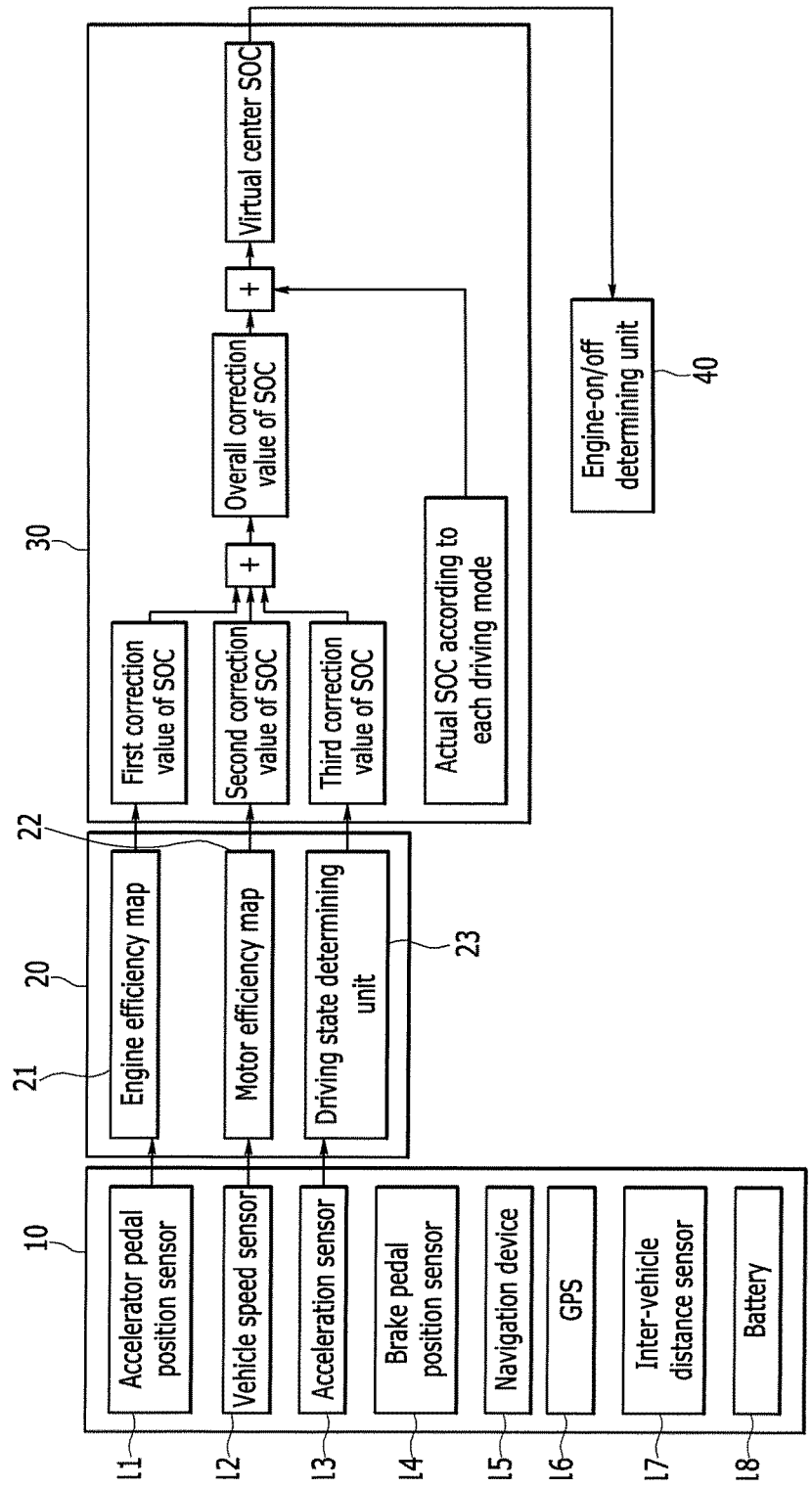
FIG. 4 is a block diagram of an apparatus for controlling a SOC of a hybrid vehicle according to the exemplary embodiment of the present invention.

FIG. 4 is a block diagram of an apparatus for controlling a SOC of a hybrid vehicle according to the exemplary embodiment of the present invention. Referring to FIG. 4, the apparatus for controlling a SOC of a hybrid vehicle of the current exemplary embodiment includes a data detector 10, a correction value calculating unit 20, a SOC calculating unit 30, and an engine-on/off determining unit 40.

The data detector 10 detects data for controlling a SOC of the hybrid vehicle and calculating a virtual center SOC, and transmits the detected data to the correction value calculating unit 20. The data detector 10 may include an accelerator pedal position sensor 11, a vehicle speed sensor 12, an acceleration sensor 13, a brake pedal position sensor 14, a navigation device 15, a global positioning system (GPS) 16, and an inter-vehicle distance sensor 17.

The accelerator pedal position sensor 11 measures how much a driver presses an accelerator pedal. That is, the accelerator pedal position sensor 11 measures data that is associated with power requested by the driver. The brake pedal position sensor 14 detects whether the driver presses a brake pedal or not. That is, along with the accelerator pedal position sensor 11 and the acceleration sensor 13, the brake pedal position sensor 14 detects data associated with the power required by the driver.

The vehicle speed sensor 12 measures a vehicle speed, and is mounted on a wheel of the vehicle. Alternatively, the vehicle speed may be calculated based on a GPS signal received by the GPS 16. The vehicle speed sensor 12 transmits the vehicle speed to an engine-off map and an engine-on map, allowing power of the engine-off map and power of the engine-on map to be compared with the power requested by the driver.

The acceleration sensor 13 detects acceleration of the vehicle. In addition to the vehicle speed sensor 12, the acceleration sensor 13 may be mounted to directly detect the acceleration of the vehicle, or may calculate the acceleration of the vehicle by differentiating the vehicle speed that is detected by the vehicle speed sensor 12.

The navigation device 15 is a device that notifies the driver of a path to a destination. The navigation device 15 includes an input/output (I/O) unit for inputting/outputting route guiding information, a current position detector for detecting information about a current position of the vehicle, a memory for storing map data necessary for route calculation and data necessary for the guide, and a control unit for executing route search or route guide.

The GPS 16 receives a radio wave transmitted from a GPS satellite, and transmits a signal to the navigation device 15 in response to the radio wave. The navigation device 15 and the GPS 16 provide data associated with charging efficiency in a driving section of the vehicle. For example, the navigation device 15 and the GPS 16 provide data about a section having high charging efficiency when the vehicle is driven on an expressway and a national highway, and provide data about a section having low charging efficiency when the vehicle is driven in a downtown area and an extremely congested section.

The inter-vehicle distance sensor 17 detects a distance between the driver's vehicle and a vehicle ahead. Various sensors such as an ultrasonic wave sensor, an infrared sensor, and the like may be used as the inter-vehicle distance sensor 17. The inter-vehicle distance sensor 17 provides data about the downtown area and the extremely congested section, along with the accelerator pedal position sensor 11, the vehicle speed sensor 12, and the brake pedal position sensor 14.

The correction value calculating unit 20 calculates a correction value of the SOC based on the data transmitted from the data detector 10. The correction value calculating unit 20 includes an engine efficiency map 21, a motor efficiency map 22, and a driving state determining unit 23 to calculate the correction value of the SOC.

That is, the correction value calculating unit 20 calculates engine efficiency from the detected data, applies the engine efficiency and the SOC to the engine efficiency map 21, and calculates a correction value of the SOC associated with the engine efficiency.

The correction value calculating unit 20 calculates motor efficiency from the detected data, applies the motor efficiency and the SOC to the motor efficiency map 22, and calculates a correction value of the SOC according to the motor efficiency.

The driving state determining unit 23 of the correction value calculating unit 20 calculates a driving state of the vehicle from the detected data, and calculates a correction value of the SOC according to the driving state of the vehicle.

In addition, the driving state determining unit 23 determines whether the vehicle enters an idle charge state and a full load state from the detected data.

The idle charge state may be a state in which the engine is forced to operate to charge the battery when the battery's SOC is very low.

The full load state refers to a state in which the vehicle is operated according to acceleration intended by a driver without considering the SOC of the battery if an amount of operating, e.g., opening, of the accelerator pedal position sensor 11 exceeds a predetermined value (e.g., if the vehicle is abruptly accelerated).

FIG. 5 is a table illustrating the engine efficiency map. Referring to FIG. 5, the engine efficiency map shows the corrected SOC value according to maximum/maximum engine efficiencies and minimum/maximum actual SOCs.

That is, in the engine efficiency map 21, the correction value of the SOC increases as the current SOC decreases and the engine efficiency increases. Conversely, the correction value of the SOC decreases as the current SOC increases and the engine efficiency decreases. The engine efficiency map 21 provides the SOC and the correction value of the SOC associated with the engine efficiency to the SOC calculating unit, and the SOC calculating unit may calculate the virtual center SOC by adding the correction value of the SOC to the current SOC.

As such, the engine efficiency map 21 includes a relationship between the minimum/maximum actual SOCs and the corrected SOC values associated with the engine efficiency. Though not illustrated, the motor efficiency map 22 includes a relationship between the minimum/maximum actual SOCs and the corrected SOC values associated with the motor efficiency.

The driving state determining unit 23 determines the driving state of the vehicle based on the data of the data detector 10. The driving state determining unit 23 provides the correction value of the SOC according to the driving state of the vehicle. The driving state determining unit 23 determines the driving state of the vehicle (e.g., whether it is driven in a downtown area, on a national highway, on an expressway, or in a congested section), and calculates the correction value of the SOC according to each driving state.

The SOC calculating unit 30 calculates the virtual center SOC by reflecting the correction value of the SOC to the actual SOC.

The SOC calculating unit 30 calculates an overall correction value of the SOC by adding a first SOC value corrected by the engine efficiency, a second SOC value corrected by the motor efficiency, and a third SOC value corrected by the driving state, and calculates the virtual center SOC by reflecting the overall correction value of the SOC to the current SOC.

The engine-on/off determining unit 40 applies the virtual center SOC or the current SOC and the vehicle speed to the engine-off map and the engine-on map, compares the power required by the driver with the map power, and determines whether the engine is turned on or turned off.

That is, in the engine-off map and the engine-on map, engine-off power and engine-on power associated with the SOC (the virtual center SOC or the actual SOC) and the vehicle speed are stored as map data.

A method for controlling a SOC of a hybrid vehicle using the apparatus for controlling a SOC of a hybrid vehicle will now be described.

Figure 6:
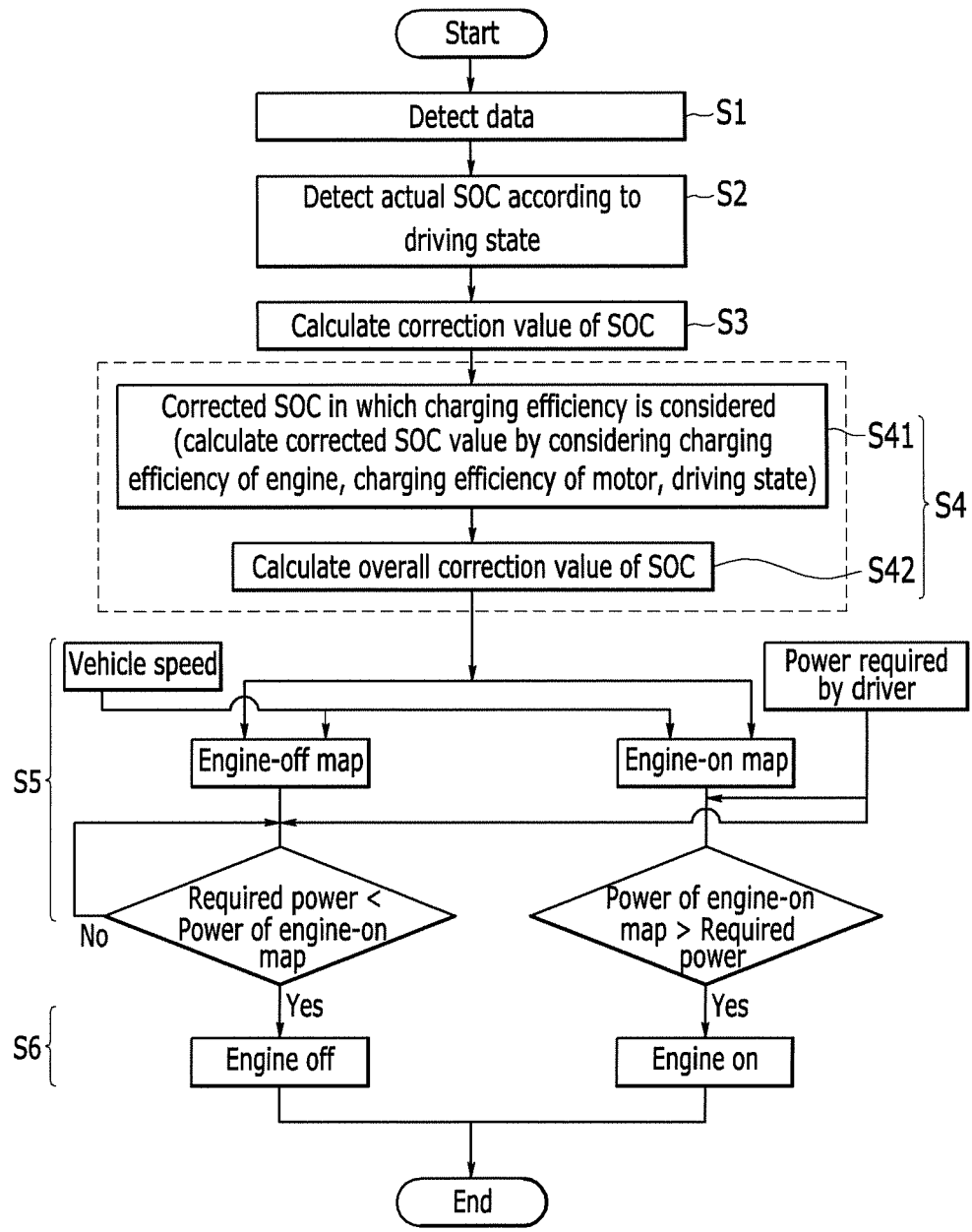
FIG. 6 is a flowchart illustrating the method for controlling a SOC of a hybrid vehicle according to the exemplary embodiment of the present invention (according to charging efficiency).

FIG. 6 is a flowchart showing the method for controlling a SOC of a hybrid vehicle according to the exemplary embodiment of the present invention. Referring to FIG. 6, the control method of the current exemplary embodiment includes first to fifth steps S1 to S5, and may further include a sixth step S6.

In the first step S1, data for controlling a SOC of a hybrid vehicle is detected. For example, a data detector 10 detects a driving path via a GPS 16 and a navigation device 15.

The navigation device 15 and the GPS 16 provide data about charging efficiency of the driving path of the vehicle. For example, in the first step S1, the navigation device 15 and the GPS 16 detect data on a section having high charging efficiency when the vehicle is driven on an expressway and a national highway, and detect data on a section having low charging efficiency when the vehicle is driven in a downtown area and an extremely congested section.

The data detector 10 detects power required by a driver via a brake pedal position sensor 14, an accelerator pedal position sensor 11, and an acceleration sensor 13. The data detector 10 detects an inter-vehicle distance, an accelerator pedal position, a vehicle speed, and a brake pedal position via an inter-vehicle distance sensor 17, the accelerator pedal position sensor 11, the vehicle speed sensor 12, and the brake pedal position sensor 14.

In addition, the data detector 10 detects a current SOC of the battery, and transmits the detected current SOC to the engine-on/off determining unit 40.

The data detector 10 transmits a signal of the vehicle speed detected by the vehicle speed sensor 12 to the engine-off map and the engine-on map.

In the second step S2, the driving state determining unit 23 detects the driving state of the vehicle based on the data detected by the data detector 10, and generates an actual SOC according to the detected driving state. In the second step S2, whether the vehicle is driven on an expressway or a national highway, or in a downtown area and an extremely congested area, is detected from the data detected in the first step S1, and an actual SOC is generated according to the detected driving state.

In the third step S3, a correction value of the SOC is calculated based on the detected data.

Specifically, the battery's SOC and the engine efficiency are calculated from the data, and the engine efficiency and the SOC are applied to the engine efficiency map 21 to calculate a correction value of the SOC (first correction value of the SOC) associated with the engine efficiency is calculated.

Specifically, the battery's SOC and the engine efficiency are calculated from the data, and the engine efficiency and the SOC are applied to the engine efficiency map 21 to calculate a correction value of the SOC (first correction value of the SOC) associated with the engine efficiency is calculated.

In addition, the battery's SOC and the motor efficiency are calculated from the data, and the motor efficiency and the SOC are applied to the motor efficiency map 21 to calculate a correction value of the SOC (second correction value of the SOC) associated with the motor efficiency is calculated.

In addition, the driving state of the vehicle is determined from the data, and a correction value of the SOC (third correction value of the SOC) associated with the driving state of the vehicle is calculated.

In the fourth step S4, the correction values of the SOC are summed to calculate an overall correction value of the SOC (S41), and the overall correction value of the SOC is reflected to the actual SOC to calculate a virtual center SOC (S42).

In the fifth step S5, whether the engine is turned on or turned off is determined based on the virtual center SOC, the engine-off map, the engine-on map, the vehicle speed, and the power required by the driver. That is, in the fifth step S5, the engine-on/off determining unit 40 applies the virtual center SOC and the vehicle speed to the engine-off map and the engine-on map, and calculates engine-off power and engine-on power.

The engine-on/off determining unit 40 determines whether the engine is turned on or turned off by comparing the engine-on power or the engine-off power from the engine-off map and the engine-on map with the power required by the driver.

Specifically, in the sixth step S6, after applying the vehicle speed and the virtual center SOC to the engine-off map, the engine is turned off when the power required by the driver is lower than the engine-on power, and after applying the vehicle speed and the virtual center SOC to the engine-on map, the engine is turned on when the power required by the driver is higher than the engine-on power.

As such, in the control method of the current exemplary embodiment, the virtual center SOC is determined according to the correction value of the SOC, and an SOC of the hybrid vehicle may be controlled by varying the virtual center SOC to control the engine to be turned off or turned on. That is, in the control method of the current exemplary embodiment, the SOC is corrected according to the engine efficiency, the motor efficiency, and the driving state of the vehicle, the battery's SOC can be maintained to be constant.

Figure 7:
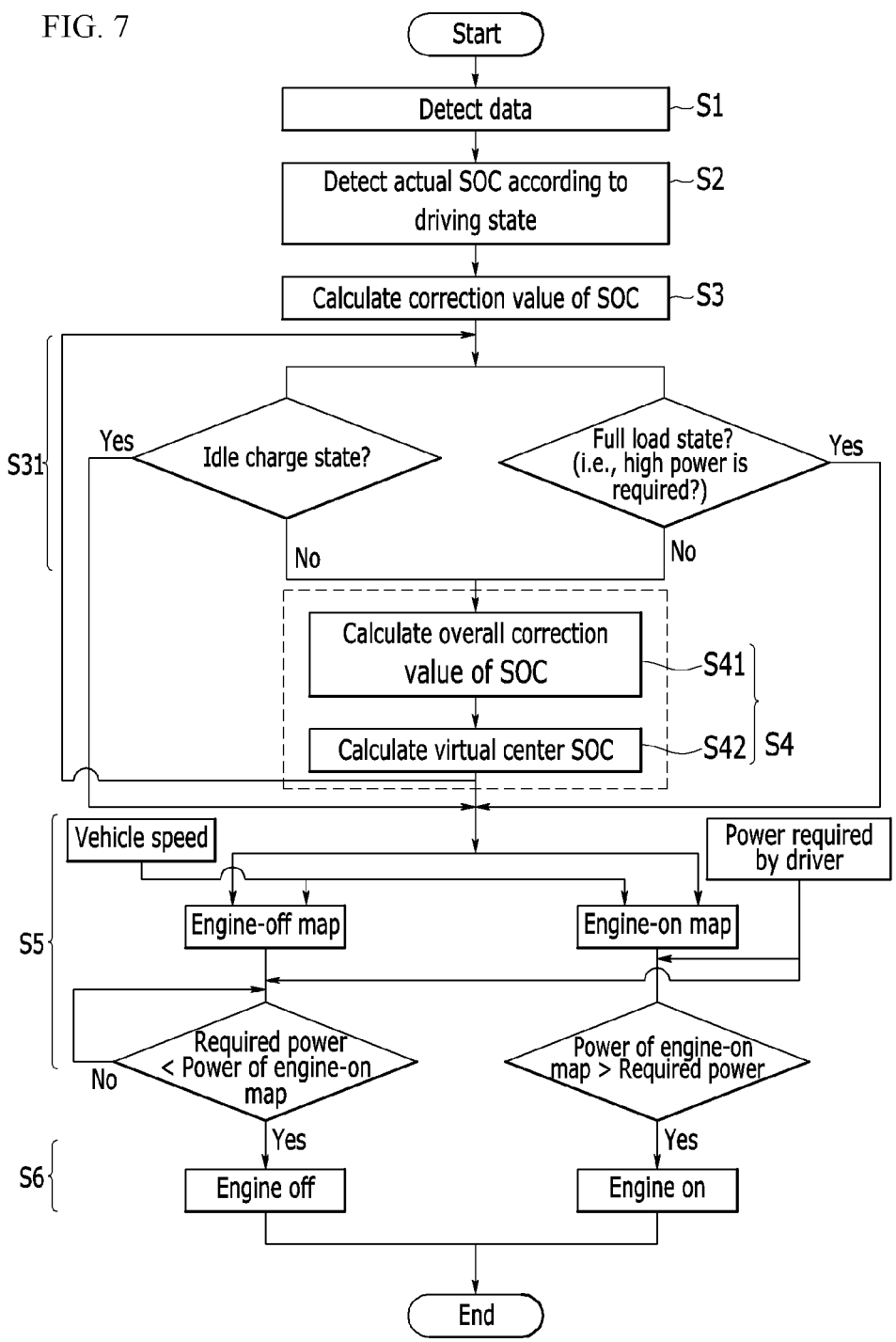
FIG. 7 is a flowchart illustrating the method for controlling a SOC of a hybrid vehicle according to the exemplary embodiment of the present invention (idle charge and full load sections).

FIG. 7 is a flowchart illustrating a method for controlling a SOC of a hybrid vehicle according to an exemplary embodiment of the present invention (idle charge and full load). Referring to FIG. 7, the third step S3 may further include a step S31 that determines whether a driving state of the vehicle enters an idle charge section and a full load section based on the detected data.

For example, the idle charge state may be entered when the driver presses the brake pedal instead of the accelerator pedal such that the accelerator pedal position sensor 11 is turned off, the brake pedal position sensor 14 is turned on, and the battery's SOC is less than a predetermined value. That is, the idle charge state may be entered when the engine is forced to operate to charge the battery when the battery's SOC is very low.

The full load state may be entered when the driver does not press the brake pedal but does press the accelerator pedal too much over a predetermined level such that the brake pedal position sensor 14 is turned off and the accelerator pedal position sensor 14 is turned on and exceeds a predetermined value. That is, the full load state may be entered when the vehicle is abruptly accelerated.

In the step S31, when the idle charge state is entered, the fourth step S4 of calculating the virtual center SOC by considering the charging efficiency according to the engine, the motor, and the correction value associated with the driving state is not executed, and when the idle charge state is not entered, the fifth step S5 is executed after executing the fourth step of calculating the virtual center SOC.

In the step S31, when the full load state is entered, the fourth step S4 is not executed, and when the full load state is entered, the fifth step S5 is executed after executing the fourth step.

That is, in the current exemplary embodiment, in the step S31, if the section having high charging efficiency is determined to be the extremely congested section (idle charge) or the section requiring high power (full load section), the fourth step S4 is not executed and the fifth step S5 is executed. Accordingly, loss in fuel efficiency caused by overcharge can be prevented.

In addition, in the current exemplary embodiment, in the step S31, the fifth step S5 is executed when the idle charge state is not entered, and the fifth step is executed when the full load state is not entered. Accordingly, high charging efficiency can be realized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling a state of charge (SOC) of a hybrid vehicle, comprising:
   a data detector configured for detecting data including an actual SOC of a battery, a vehicle speed, an amount of operating of a brake pedal sensor, an amount of operating of an acceleration pedal sensor, and a driving state of a vehicle;
   a correction value calculating unit configured for calculating a correction value of the SOC based on the data;
   a SOC calculating unit configured for calculating a virtual center SOC based on the correction value of the SOC and the actual SOC; and an engine-on/off determining unit configured for determining whether an engine is turned on or turned off based on the virtual center SOC.

2. The apparatus of claim 1, wherein the correction value calculating unit applies engine efficiency and a current SOC to an engine efficiency map to calculate a first correction value of the SOC associated with the engine efficiency, applies motor efficiency and the current SOC to a motor efficiency map to calculate a second correction value of the SOC associated with the motor efficiency, and calculates a third correction value of the SOC associated with the driving state of the vehicle.

3. The apparatus of claim 2, wherein the SOC calculating unit calculates an overall correction value of the SOC by summing the first, second, and third correction values of the SOC.

4. The apparatus of claim 3, wherein the SOC calculating unit calculates a virtual center SOC by applying the overall correction value of the SOC to the current SOC.

5. The apparatus of claim 4, wherein the engine-on/off determining unit determines whether the engine is turned on or turned off by applying the virtual center SOC and the vehicle speed to an engine-off map and an engine-on map to calculate engine-off power and engine-on power, and by comparing the engine-on and engine-off powers with power required by a driver.

6. The apparatus of claim 2, wherein the correction value calculating unit further includes a driving state determining unit that determines whether the driving state enters an idle charge state or a full load state based on the data.

7. A method for controlling an SOC of a hybrid vehicle, comprising:
    a first step of detecting, by a data detector, data including a vehicle speed, an amount of operating of a brake pedal sensor, an amount of operating of an acceleration pedal sensor, and a driving state of a vehicle;
    a second step of detecting, by the data detector, an actual SOC of a battery;
    a third step of calculating, by a correction value calculating unit, a correction value of the SOC based on the data;
    a fourth step of calculating, by a SOC calculating unit, a virtual center SOC based on the correction value of the SOC and the actual SOC; and
    a fifth step of determining, by an engine-on/off determining unit, whether an engine is turned on or turned off based on the virtual center SOC and the vehicle speed.

8. The method of claim 7, wherein, in the third step, engine efficiency and a current SOC is applied to an engine efficiency map to calculate a first correction value of the SOC associated with the engine efficiency, motor efficiency and the current SOC is applied to a motor efficiency map to calculate a second correction value of the SOC associated with the motor efficiency, and a third correction value associated with the driving state of the vehicle is calculated.

9. The method of claim 8, wherein, in the fourth step, the first, second, and third correction values of the SOC are summed to calculate an overall correction value of the SOC.

10. The method of claim 9, wherein, in the fourth step, the overall correction value is applied to calculate a virtual center SOC.

11. The method of claim 10, wherein, in the fifth step, whether the engine is turned on or turned off is determined by applying the virtual center SOC and the vehicle speed to an engine-off map and an engine-on map to calculate engine-off power and engine-on power, and by comparing the engine-on and engine-off powers with power required by a driver.

12. The method of claim 11, the engine is turned off if the power required by the driver is lower than the engine-off power, and the engine is turned on if the power required by the driver is higher than the engine-off power.

* * * * *